United States Patent
South et al.

(10) Patent No.: US 9,933,041 B2
(45) Date of Patent: Apr. 3, 2018

(54) CVT BELT

(71) Applicant: GATES CORPORATION, Denver, CO (US)

(72) Inventors: Bobbie E. South, New Bloomfield, MO (US); Jerzy Otremba, Troy, MI (US); John Francisco Dayberry, Siloam Springs, AR (US)

(73) Assignee: Gates Corporation, Denver, CO (US)

( * ) Notice: Subject to any disclaimer, the term of this patent is extended or adjusted under 35 U.S.C. 154(b) by 209 days.

(21) Appl. No.: 15/152,452

(22) Filed: May 11, 2016

(65) Prior Publication Data
US 2016/0333963 A1   Nov. 17, 2016

Related U.S. Application Data

(60) Provisional application No. 62/159,815, filed on May 11, 2015.

(51) Int. Cl.
*F16G 5/06* (2006.01)
*F16G 1/28* (2006.01)
(Continued)

(52) U.S. Cl.
CPC ............... *F16G 5/06* (2013.01); *F16G 1/08* (2013.01); *F16G 1/28* (2013.01); *F16G 5/16* (2013.01); *F16G 5/20* (2013.01)

(58) Field of Classification Search
CPC ..... F16G 1/08; F16G 1/28; F16G 5/06; F16G 5/16; F16G 5/20; C08K 7/02; C08L 23/0815; C08L 23/15; C08L 2205/16
See application file for complete search history.

(56) References Cited

U.S. PATENT DOCUMENTS 5,498,213 A   3/1996 Mishima
5,610,217 A   3/1997 Yarnell et al.
(Continued)

FOREIGN PATENT DOCUMENTS

CN   102702643 A   10/2012
EP   1894693 A1   3/2008
(Continued)

OTHER PUBLICATIONS

Lapinus Fibres, "Heracron® aramid pulp for improved processing and performance of friction materials", LAPINUS® Technical Leaflet, Copyright: Lapinus Fibres, Aug. 2010.

*Primary Examiner* — William E Dondero
*Assistant Examiner* — Robert T Reese
(74) *Attorney, Agent, or Firm* — Paul N. Dunlap, Esq.; Jeffrey A. Thurnau, Esq.

(57) ABSTRACT

An endless rubber power transmission belt such as a CVT belt having a main belt body with a compression portion, tension portion, an adhesion portion, and a tensile cord in contact with the adhesion portion and embedded between the compression portion and the tension portion, angled sides, and a width to thickness ratio on the order of 2 to 3. At least one of the compression portion, the tension portion and the adhesion portion has an elastomer composition that includes a saturated ethylene-alpha-olefin elastomer, a staple fiber, and a pulp fiber, or an elastomer, a high-modulus staple fiber, and a high-modulus pulp fiber. The pulp fiber constitutes less than 40% of the total high-modulus fiber amount.

16 Claims, 6 Drawing Sheets

(51) Int. Cl.
*F16G 1/08* (2006.01)
*F16G 5/16* (2006.01)
*F16G 5/20* (2006.01)

(56) References Cited

U.S. PATENT DOCUMENTS

| | | | |
|---|---|---|---|
| 5,624,338 | A | 4/1997 | Kawashima et al. |
| 6,419,775 | B1 * | 7/2002 | Gibson .................. B32B 25/10 |
| | | | 156/137 |
| 6,511,394 | B2 | 1/2003 | Okuno et al. |
| 7,189,785 | B2 | 3/2007 | Okuno |
| 7,201,688 | B2 | 4/2007 | Wu |
| 7,485,060 | B2 | 2/2009 | Hineno et al. |
| 8,113,338 | B2 | 2/2012 | An |
| 8,197,372 | B2 | 6/2012 | Wu et al. |
| 8,262,522 | B2 | 9/2012 | Dieudonne et al. |
| 8,672,788 | B2 | 3/2014 | Duke et al. |
| 2002/0032091 | A1 | 3/2002 | Okuno et al. |
| 2002/0036129 | A1 | 3/2002 | Breed et al. |
| 2005/0043486 | A1 | 2/2005 | Okuno |
| 2007/0066756 | A1 | 3/2007 | Poon et al. |
| 2007/0244263 | A1 | 10/2007 | Burrowes |
| 2008/0004145 | A1 * | 1/2008 | Duke .................... B29D 29/08 |
| | | | 474/205 |
| 2009/0081473 | A1 | 3/2009 | Ohno |
| 2010/0203994 | A1 | 8/2010 | Fujikawa et al. |
| 2010/0240809 | A1 | 9/2010 | Yamada |
| 2011/0300981 | A1 | 12/2011 | Takahashi et al. |
| 2012/0295748 | A1 | 11/2012 | Shiriike |
| 2013/0098494 | A1 | 4/2013 | Yajima et al. |
| 2013/0237354 | A1 | 9/2013 | Shiriike |

FOREIGN PATENT DOCUMENTS

| | | |
|---|---|---|
| EP | 2105460 | 9/2009 |
| JP | 2010248401 A | 11/2010 |
| WO | 2007018148 A1 | 2/2007 |
| WO | 2010047029 A1 | 4/2010 |
| WO | 2013131207 A1 | 9/2013 |
| WO | 2014004359 A1 | 1/2014 |
| WO | 2014028641 A1 | 2/2014 |
| WO | 2014064879 A1 | 5/2014 |
| WO | 2014119625 A1 | 8/2014 |
| WO | 2015045255 A1 | 4/2015 |

* cited by examiner

CVT BELT

BACKGROUND OF THE INVENTION

This invention relates generally to a power transmission belt for a continuously variable transmission ("CVT"), more particularly to a CVT belt with a fiber-loaded rubber composition, and specifically a rubber composition based on polyolefin elastomer with both pulp and staple high-modulus fiber.

A CVT generally has some kind of closed-loop control or feedback mechanism for automatic and relatively rapid shifting based on the dynamics of the drive in a system. Often, in a CVT the driver sheave is controlled based on or reacts to a speed measurement or speed change in order to keep the power source or motor within an optimum power or speed range, and the driven sheave is controlled based on or reacts to the torque load. The variable-pitch sheaves may be adjusted by various mechanisms including mechanical, electro-mechanical, electronic, hydraulic, or the like. Belt-driven CVTs are widely used in scooters, all-terrain vehicles ("ATV"), snowmobiles, agricultural equipment, heavy equipment accessory drives, and other vehicles. Generally, as two pulley halves move axially apart or together to force a change in belt radial position in a CVT, the belt may be subjected to extreme friction forces as the belt changes radial position within the sheaves. As two sheave halves move together axially to increase the pitch line of the belt, the belt is subjected to extreme friction forces and to high axial or transverse compressive forces. High and variable torque loads result in high tension forces and high wedging forces which also result in high transverse compressive forces and frictional forces on the belt. Some applications also use the belt as a clutch, resulting in additional frictional forces on the contact surfaces of the belt. All these forces may be very severe in a CVT because of the dynamics of the applications (e.g. frequent, rapid shifts, with high acceleration loads). As the CVT belt traverses the driver and driven pulleys, it is also subjected to continual bending or flexing. Rubber CVT belts are generally used without lubrication in so-called "dry CVT" applications. Thus, the CVT belt needs to have good longitudinal flexibility, high longitudinal modulus, high abrasion resistance, and high transverse stiffness. The belt must operate across a wide temperature range, for a long time.

Representative of the art is U.S. Pat. No. 6,620,068, which discloses a raw-edge double-cogged V-belt for variable speed drives having curvilinear cogs on the inside and outside, a layer of spirally wrapped cords made of fibers such as polyester, aramid, and/or glass fiber. The belt includes compression and tension layers of rubber containing short fibers aligned laterally for transverse reinforcement. The belt also includes a layer of reinforcing fabric on the inside and/or outside cog surfaces.

Also representative of the art is U.S. Pat. No. 4,708,703, which discloses a CVT belt with aligned upper and lower teeth and grooves, and with longitudinal cords. The teeth are preferably covered at their tops with transverse stiffening elements to deal with the problem of buckling and to increase the torque capability.

U.S. Pat. No. 6,485,386 relates to rigid inserts in a cogged V-belt to increase transverse stiffness. Herein and in the claims, the term "rubber CVT belt" excludes the use of such rigid inserts or stiffening elements, as well as the use of external rigid appendages or clips or blocks.

Yet, CVT belts need high transverse stiffness due to the aspect ratio and the high axial forces in use. Various approaches to increasing stiffness have been tried in the past. The most common approach is to incorporate transversely oriented chopped fibers into the belt body. This approach has limits.

U.S. Pat. No. 7,189,785 relates to a blend of HNBR and EPDM or other ethylene-alpha-olefin elastomer. Extensive data on chopped fiber-loaded elastomers is included. It teaches that too much (more than 20 parts weight per hundred parts of elastomer ("phr") leads to processing problems, without benefits regarding heat build up.

U.S. Pat. No. 8,672,788 relates to a vulcanized rubber CVT belt in the form of an endless V-belt having a belt body with angled sides, a tensile cord layer of helically spiraled tensile cord embedded in the belt body, an overcord rubber layer, and an undercord rubber layer, wherein the tensile cord is a twisted, single-tow bundle of continuous-filament, carbon fiber. It teaches that the use of 18 k carbon cord increased the transverse stiffness of the CVT belt.

U.S. Pat. No. 5,610,217 relates to a power transmission belt with a main belt body portion incorporating an elastomeric composition with an ethylene-alpha-olefin elastomer reinforced with a filler and a metal salt of an α-β-unsaturated organic acid.

U.S. Pat. No. 6,616,558 relates to at least one of said elastomeric belt body portion and said adhesive rubber member exhibits at least one of a complex modulus measured at 175° C., at 2000.0 cpm and at a strain of 0.09 degrees, of at least 15,000 kPa; and a tensile modulus, measured at 10% elongation, of at least 250 psi (1.724 MPa).

U.S. Pat. No. 6,511,394 relates to an elastomer composition with an elastomer blend of low and high molecular weight ethylene-alpha-olefin polymers.

WIPO Publ. No. WO2010/047029A1 relates to a rubber composition for a flat transmission belt comprising an ethylene-α-olefin elastomer.

WO2015/045255A1 relates to a cogged V-belt composition with mixture of short nylon or PET nano-fibers and chopped para-aramid fibers in EPDM elastomer.

U.S. Pat. No. 6,358,171 to Whitfield discloses use of aramid pulp or staple fibers in toothed belts.

It is not known or suggested to use a blend or combination of aramid pulp fiber and aramid chopped fiber in the main belt-body ethylene-alpha-olefin elastomer composition of a power transmission belt.

SUMMARY

The present invention is directed to systems and methods which provide CVT belts with high transverse stiffness.

CVT belts need high transverse stiffness due to the aspect ratio and the high axial forces in use. Thus, the present invention relates to a rubber composition in a CVT belt. The rubber composition is fiber-loaded with both staple and pulp fibers, preferably aramid fibers. The elastomer is preferably saturated ethylene-alpha-olefin elastomer. The composition is calendered to orient the fibers transverse to the belt running direction, i.e., axially with respect to the axis of the pulleys or sheaves on which the belt runs. The resulting belt axial or transverse stiffness is in a predetermined range, resulting in significant performance benefits over conventional CVT belts.

In some embodiments the invention is directed to an endless rubber CVT belt having a main belt body having a compression portion, tension portion, an adhesive layer, and a tensile cord in contact with the adhesion portion and embedded between the compression portion and the tension portion, angled sides, and a width to thickness ratio on the order of 2 to 3; wherein at least one of the compression portion, the tension portion and the adhesion portion comprises an elastomer composition comprising a saturated ethylene-alpha-olefin elastomer, a staple fiber, and a pulp fiber, or an elastomer, a high-modulus staple fiber, and a high-modulus pulp fiber; wherein the pulp fiber constitutes less than 40% (or less than 35%) of the total high-modulus fiber amount.

The ethylene content of a suitable ethylene-octene elastomer is in the range of 60.0% to 65.0% by weight, or below 75%, or below 70%, or the melt flow rate of the ethylene-octene elastomer is less than 5 or less than or equal to 1.0 or 0.5 gm/10 min. or less, The total amount of the staple fiber and pulp fiber may be between 3 and 19 volume percent of the composition or between 1 and 65 phr. One or both fibers may be aramid fibers.

In some embodiments the belt exhibits a stiffness on the Dynamic Axial Stiffness Test of greater than 5.0 kN/mm or greater than 6.0 kN/mm or greater than 7.0 kN/mm, or from about 7 to about 8 kN/mm.

In some embodiments the belt exhibits a stiffness on the Gates Compression Test of greater than or equal to 5.0 kN/mm at 90° C. or greater than 6.0 kN/mm or 7.0 kN/mm or 8 kN/mm at room temperature, or from about 8 to about 9 kN/mm at room temperature.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The problem of improving CVT belt performance can be tied to the underlying problem of increasing transverse stiffness while improving or at least maintaining a lot of other properties, such as longitudinal flexibility, crack resistance, thermal resistance, frictional properties, hysteretic properties, adhesion, tensile strength, etc.

It has been known that loading of the rubber composition with short fiber for the belt body can lead to increased stiffness. Orienting the fiber in the transverse direction can increase transverse stiffness of the belt while maintaining a higher level of flexibility in the longitudinal direction (anisotropic modulus). However, the problem of mixing, dispersing and orienting high modulus fibers into the rubber composition limits the amount of such fiber that can be practically added. Now it has been discovered that a proper blend of two different fiber types, and judicious choice of the base elastomer can have a dramatic effect on a rubber composition modulus and stiffness of the final compound while still giving improved processing and ultimately improving the resulting CVT belt performance. By shifting the ratio of pulp to staple fiber, while adopting the unique properties of the ethylene-alpha-olefin or polyolefin elastomer, one can obtain a significantly improved level of stiffness in the resulting belt which has in turn resulted in exceptional durability and load carrying capabilities.

Thus, the present invention relates to a rubber composition for a CVT belt. The rubber composition is fiber-loaded with both staple and pulp fibers, preferably aramid fibers. The elastomer is preferably ethylene-alpha-olefin elastomer. The composition is calendered or extruded to orient the fibers (longitudinally in a calendered sheet material), then arranged to be oriented transverse to the belt running direction in the final belt, i.e., axially with respect to the axis of the pulleys or sheaves on which the belt runs. The resulting belt axial or transverse stiffness is in a predetermined range, resulting in significant performance benefits over conventional CVT belts.

Figure 3:
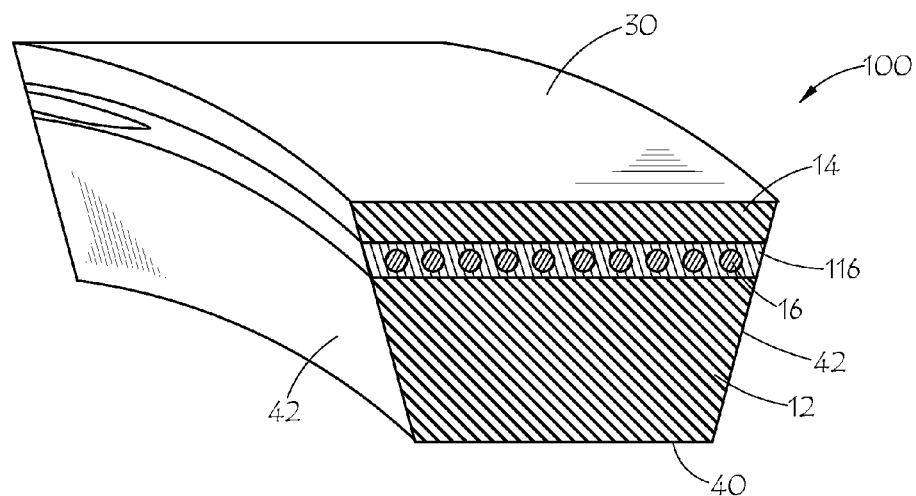
FIG. 3 is a partially fragmented perspective view of another embodiment of the invention.

FIG. 3 shows a typical embodiment of the invention in the form of a CVT belt. Belt 100 has a generally isosceles trapezoidal cross section, with back-, upper-, outer- or top-side 30 parallel to bottom-, lower-, or inner-side 40. The other two sides, lateral sides 42 are the pulley contact surfaces which define a V-shape with included angle α. The belt body includes tensile cord 16 embedded in optional adhesion portion or adhesion gum layer 116, a tension portion or overcord layer 14, and a compression portion or undercord layer 12. Adhesion gum layer 116, overcord layer 14, and undercord layer 12 are generally vulcanized rubber compositions, at least one of which is of an inventive composition described herein. At least the undercord layer may include dispersed short fibers oriented in the transverse direction to increase transverse stiffness of the belt body while maintaining longitudinal flexibility. Tensile cord 16 is the longitudinal load carrying member. It may be a high modulus, fatigue resistant, twisted or cabled bundle of fibers, such as polyester, aramid, carbon, PBO or glass fibers or yarns, and may be treated with an adhesive. In some embodiments, the tensile cord may be a twisted, single-tow carbon fiber yarn of approximately 12,000 or 18,000 carbon fibers, as described for example in U.S. Pat. No. 8,672,788, the contents of which are hereby incorporated herein by reference. The underside or bottom of the belt is often "notched" or "cogged," i.e., given a wavy profile, to improve the balance of flexibility and stiffness required from the belt body. The bottom of the belt may be given an undercord fabric cover (or notch fabric) (not shown) to decrease the formation and propagation of cracks in the undercord and to increase the transverse stiffness of the belt body. Likewise the belt back may be given an overcord fabric cover (not shown) for similar reasons. In one embodiment, no fabric is used.

Figure 2:
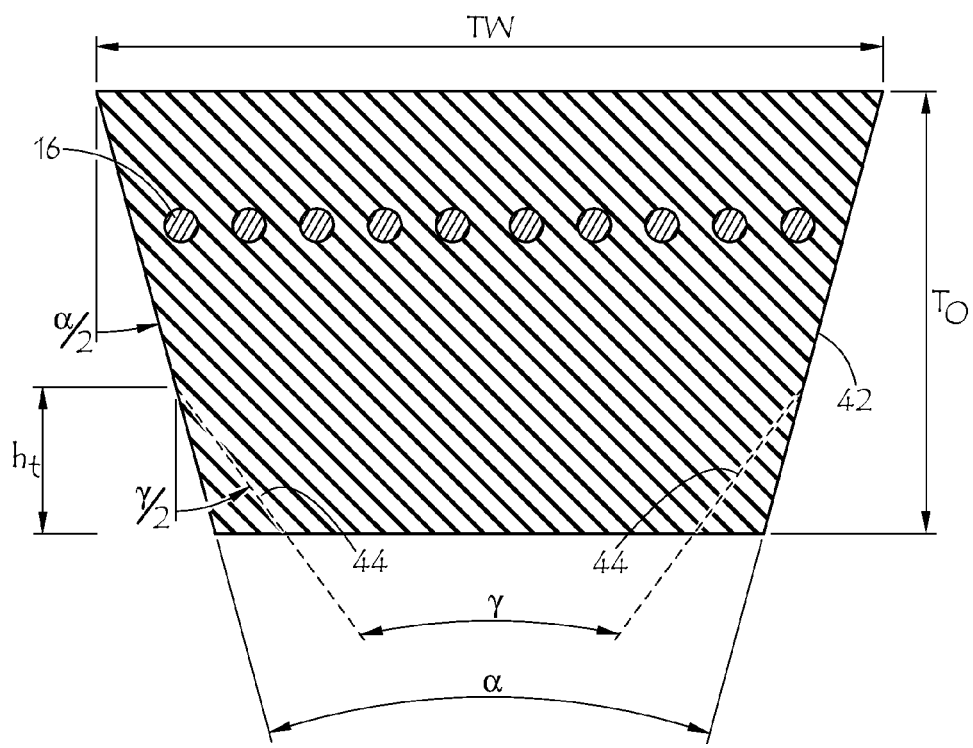
FIG. 2 is a cross sectional view of the embodiment of FIG. 1 through 2-2.

FIG. 2 shows another embodiment of the invention in cross section, having a single rubber composition for the belt body and tensile cords 16 embedded therein. The overall belt width is called the top width and identified as "TW" in FIG. 2. The overall thickness of the belt is identified as "$T_0$". For wide-range variable-speed drives, such as the CVT applications mentioned above, special belt cross sections that are relatively wide and thin, compared to single-speed V-belts, are required. Whereas a typical, conventional V-belt generally has a top-width of about the same dimension as the thickness, or a ratio of $TW/T_0$ from about 1 to about 1.7, a CVT belt according to the invention is typically at least around twice as wide as it is thick, or having a ratio of $TW/T_0$ of from about 2 to about 2.5 or even to about 3.0. The width, thickness and V angle determine the range of speed variation possible, as is known in the art. See for example, Wallace D. Erickson, ed., "Belt Selection and Application for Engineers," Marcel Dekker, Inc., New York, (1987), the contents of which are hereby incorporated herein by reference, and especially chapter six by David E. Roos, "Variable-Speed Drive Design Using V-Belts."

Figure 1:
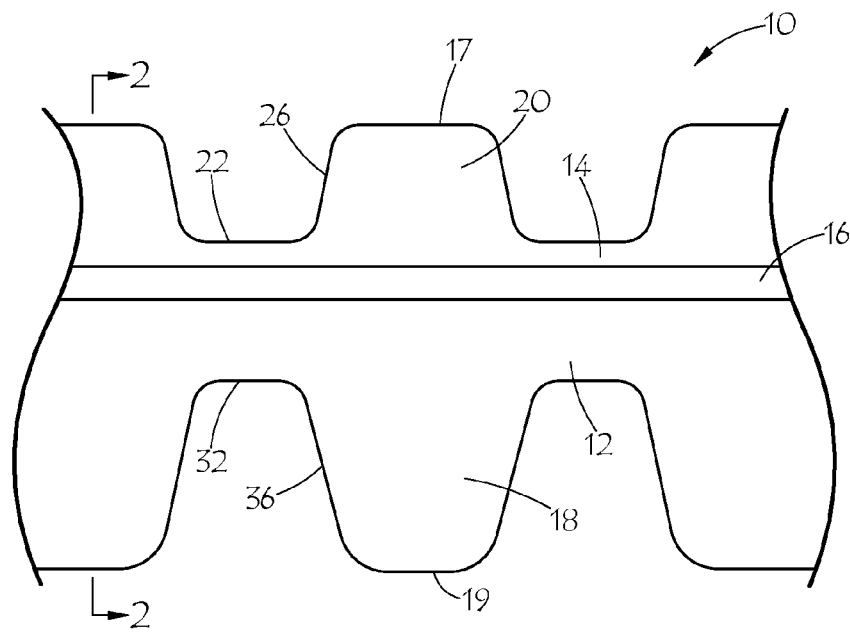
FIG. 1 is a partially fragmented side view of an embodiment of the invention.

The CVT belt may have cogs on the inside, backside or both sides as illustrated in FIG. 1. Referring to FIG. 1, double-cogged CVT belt 10 includes tensile cord layer 16 sandwiched between overcord layer 14 and undercord layer 12 making up the main body of the belt. The double-cogged V-belt shown in FIG. 1 also has lower cogs 18 and upper cogs 20 protruding from the main belt body. Upper cogs 20 include tip 17, flank 26 and valley or root 22. Likewise lower cogs 18 include tip 19, flank 36 and root 32. The double-cogged V-belt of FIG. 1 is drawn in rack form, i.e., flat and without curvature of the tensile layer. Representative cog profiles which may be used include, for example, the profiles disclosed in U.S. Pat. Nos. 8,206,251, 8,333,674, and 8,425, 357, the contents of which are hereby incorporated herein by reference.

FIG. 2 shows a cross section of an embodiment of the invention taken at the plane 2-2 in FIG. 1 and illustrating an optional relief angle feature of the inventive belt. The pulley contact faces or side surfaces 42 of the V-belt are cut at an angle $\alpha/2$ with respect to the vertical axis of the belt, which should generally coincide with the vertical axis of a pulley or drive system. Thus, a pair of opposing belt side surfaces 42 describe an included angle $\alpha$. Each side surface 42 engages a sheave during operation, with the sheave angles also substantially equal to $\alpha/2$. The belt may optionally include an opposing pair of second side surfaces 44 which are disposed toward the inside surface of the belt or the lower cog tip 19 and which are cooperating with the first side surfaces 42 by intersecting at a height $h_r$, measured from lower tip 19. Each pair of second side surfaces 44 describes an included angle $\gamma$. Angle $\alpha$ may be in the range of approximately 15° to 50° (so about 7° to about 25° per pulley sheave angle). Angle $\gamma$ may be in the range of approximately 25° to 65°. Namely, $\gamma=\alpha+(2\times$ relief angle). The "relief angle" may be equal to or greater than approximately 5° and may be defined as $(\gamma/2-\alpha/2)$. Although FIG. 1 from which the view of FIG. 2 was taken is of a double-cogged CVT belt, it should be understood that the section of FIG. 2 is equally representative of a single-cogged CVT belt or a CVT belt with no cogs.

Turning to a more detailed description of the rubber compositions in the CVT belt, the usual definition of "rubber" or "elastomer" is used herein, namely a material that can be stretched repeatedly to at least about twice its original length and which will return upon immediate release of the stress to approximately its original length. Herein, the term "elastomer" or "base elastomer" will be restricted to the elastomeric polymers used to form the composition, while "rubber" or "rubber composition" will be used to indicate a composition including the base elastomer and other compounding ingredients, unless otherwise indicated by the context. Most rubber is given its final properties by compounding the base elastomer with fillers, process aids, anti-degradants, curatives, etc., followed by crosslinking or vulcanizing by heating. The final properties of the fiber-loaded rubber compositions of the present invention may not necessarily achieve more than twice their original length without breaking, particularly in the direction of fiber orientation, so this part of the standard definition may be relaxed herein.

The compounding principles elucidated herein are believed to be applicable to a wide variety of elastomers useful in belts, such as polychloroprene (CR), nitrile-butadiene (NBR, HNBR), polyolefin elastomers including copolymers and terpolymers with unstaturation or those that are fully saturated, natural rubber (NR), and so on. However, the preferred materials are saturated polyolefin elastomers (POE), such as ethylene-alpha-olefin copolymer elastomers, including ethylene-propylene, ethylene-butene, ethylene-pentene, ethylene-octene and so on. By saturated is meant no double bonds in the main chain or pendant thereto, except possibly in one or both end groups. The most preferred elastomers are ethylene-octene elastomer (EOM), ethylene-butene (EBM), and ethylene-propylene elastomers (EPM). In various embodiments, the rubber composition to be described may be used in at least one of the above mentioned belt layers, i.e., adhesion gum layer, overcord layer, and undercord layer, or in two or in all layers. The compositions may include only the base elastomer as the sole elastomer present, or there may be a blend of the base elastomer with one or more other elastomers. The base elastomer is always more than 50% of the total of all elastomers present, preferably more than 70% or 80% or more or about 90% or more, by weight or by volume.

Useful ethylene-octene elastomers may be exemplified by the ENGAGE polyolefin elastomers sold under that trademark by The Dow Chemical Company. The EOM may have a melt index less than or equal to 5, preferably less than equal to 1, or most preferably less than or equal to 0.5 grams/10 minutes (2.16 kg@190° C.) per ASTM D1238-13. The EOM may have a density (g/cc) between 0.850 and 0.875, preferably equal to or between 0.855 and 0.870 density, most preferably between 0.860 and 0.870. The ethylene content may be from 60 to 65 weight percent for EOM.

Useful ethylene-butene elastomers may be exemplified by the ENGAGE polyolefin elastomers sold under that trademark by The Dow Chemical Company and the EXACT copolymers sold under that trademark by ExxonMobil Chemical and the TAFMER copolymers sold under that trademark by Mitsui Chemicals Group. The EBM may have a melt index less than or equal to 5, preferably less than equal to 1, or most preferably less than or equal to 0.5 grams/10 minutes (2.16 kg @ 190° C.) per ASTM D1238-13. The EBM may have a density of equal to or between 0.850 and 0.890, or from 0.850 to 0.880, or from 0.850 to 0.870. The ethylene content may be from 40 to 60 weight percent for EBM.

The belt compositions of various embodiments include both staple or chopped high-modulus fibers, and pulp or fibrillated high-modulus fibers, preferably both of aramid or aromatic polyamide materials.

The preferred aramid fibers that may beneficially be used as a reinforcement of the belt elastomer include meta-aramids, para-aramids, and para-aramid copolymers, such as those sold under the trademarks KEVLAR and NOMEX by DuPont and TECHNORA, CONEX, and TWARON by Teijin. The fibers include both fibrillated or pulped fibers and chopped or staple fiber. For purposes of the present disclosure, the terms "fibrillated" and "pulp" shall be used interchangeably to indicate this type of fiber, and the terms, "chopped" or "staple" will be used interchangeably to indicate that type of fiber. The fibers may optionally be treated as desired based in part on the fiber and elastomer type to improve their adhesion to the elastomer. An example of a fiber treatment is any suitable resorcinol formaldehyde latex (RFL).

The fibers of the staple or chopped variety may be formed of a suitable aramid or other high-performance fiber and have an aspect ratio or "L/D" (ratio of fiber length to diameter) preferably equal to 10 or greater. Staple fibers generally have a uniform cross section over their entire length. The staple fibers may have a length from about 0.1 to about 10 mm, or to about 5 mm, preferably from about 1 to about 3 mm. The staple fibers may have a diameter from about 1 to about 30 microns, preferably from about 6 to about 20, or about 10 to 15 microns. A mixture of staple fiber types, lengths, or diameters may be used. Although para-aramid fibers are preferred, the staple fibers may be of other high-performance or high-modulus polymer materials, such as meta-aramid, polybenzobisoxazole (PBO), polyetheretherketone, vinylon, nylon, polyacrylonitrile, liquid crystal polymer, or the like.

The high-modulus fibers of the pulped or fibrillated variety may be processed where possible for a given fiber type to increase their surface area, formed preferably of a suitable para-aramid, and may possess a specific surface area of from about 1 $m^2/g$ to about 15 $m^2/g$, more preferably of about 3 $m^2/g$ to about 12 $m^2/g$, most preferably from about 7 $m^2/g$ to about 11 $m^2/g$; or an average fiber length of from about 0.1 mm to about 5.0 mm, more preferably of from about 0.3 mm to about 3.5 mm, and most preferably of from about 0.5 mm to about 2.0 mm. The pulp fiber may have fibrils of irregular cross section and shape, but primarily, pulp is characterized by the presence of many, much smaller diameter fibrils having been split off of or branched from the original fibers. It may be noted that herein, the term "pulp" has nothing to do with wood, paper, fruit, fiction or any other common usages from other fields, but is only used here and in the claims as defined herein.

The total amount of pulp and staple fiber in the composition may range from about 1 phr to 65 phr, preferably from about 6 to about 50 phr, or from about 17 to about 35 phr. The amount of aramid pulp or fibrillated fiber used in various embodiments of the invention may beneficially be from about 0.5 to about 25 parts per hundred weight of elastomer (phr); is preferably from about 0.9 to about 20 phr, more preferably from about 1.0 to about 15 phr, and is most preferably from about 2.0 to about 10 phr. The amount of aramid staple fiber used in a preferred embodiment of the invention may beneficially be from about 0.5 to about 40 parts per hundred weight of elastomer (phr); is preferably from about 5 to about 35 phr, more preferably from about 10 to about 30 phr, and is most preferably from about 15 to about 25 phr. The optimum amounts may depend on the amounts and types of each fiber used, the type of elastomer, and the end result desired. The range of aramid pulp content is greater than 0, or greater than 5% or 10%, and less than 100% or 70% or 60% of the total fiber weight. Preferably the aramid pulp weight is less than 50% or 45% or 40% or 35% of the total fiber weight. With saturated polyolefin elastomers such as EOM or EBM elastomers, the higher pulp levels are possible, while for other elastomers such as EPDM or CR, the lower range, less than or equal to 40% or 35% or less of the total fiber, is required.

More directly related to the end properties is the fiber volume percent and the relative amount of pulp as a percent of the total fiber volume. These amounts of pulp and staple fiber are important for, and may be selected for, the desired end properties of the composition as well as for the processability thereof, and may depend on other factors as fiber length and degree of fibrillation and the choice of elastomer. In various embodiments, for example, those based on 1 to 3 mm length para-aramid fiber for both staple and pulp portions in polyolefin elastomers, the total fiber volume percent is advantageously between 3 and 19 volume percent. The total fiber concentration may advantageously be between 5 and 17 volume percent, or between 7 and 15 volume percent. The total volume percent of fiber may be from 9 to 13 volume percent. The range of aramid pulp volume content is greater than 0, or greater than 5% or 10%, and less than 100% or 70% or 60% of the total fiber volume. Preferably the aramid pulp volume content is less than 50% of the total fiber volume. More preferably the pulp level is 40% or less of the total fiber. Most preferably the pulp content is less than 35% of the total fiber content.

The other ingredients in the composition may be selected as usual in the art. One skilled in the relevant art would recognize that the elastomer would preferably be modified to include additional materials, e.g. plasticizers, anti-degradants, reinforcing particulate fillers such as carbon black and silica, curatives, coagents, and possibly other fibers both natural and synthetic such as, cotton, kenaf, hemp, wool, flax, wood fiber, nylon, polyester, rayon, polyvinyl alcohol, polyvinyl acetate, acrylic, etc. If other high-modulus staple fibers, of similar length and reinforcing effect as the primary fibers described above, are included, they should be included in the total fiber content.

For best wear resistance, the polyolefin elastomer compositions may be peroxide cured with suitable coagents. The preferred coagents are metal salts of an α-β-unsaturated organic acid as disclosed in U.S. Pat. No. 5,610,217, the entire contents of which are hereby incorporated herein by reference. Exemplary metal salts are zinc diacrylate and zinc dimethacrylate (ZDMA).

Mixing, Calendering, Molding, Etc.

The fibers may be added to the elastomer composition via any suitable or conventional technique, such as by first incorporating fibrillated fibers in a suitable first elastomer composition to form a fiber-loaded master batch having, for example, a final fiber content of about 50% by weight, or any other suitable amount; thereafter adding the fiber loaded master batch to the belt elastomer composition in order to allow for suitable distribution of the fiber in the belt elastomer composition; and then forming the belt with the thus fiber loaded elastomer composition via any suitable or conventional technique.

EXAMPLES

In the following examples, inventive examples are indicated as "Ex." And comparative examples as "Comp. Ex."

In a first set of examples, the rubber compositions are shown in volume percent in Table 1, and in phr in Table 2. Ex. 1 and Ex. 2 illustrate rubber compositions based on EOM elastomer with two different ratios of Kevlar pulp to para-aramid (1-mm chopped Technora) staple fiber. Comp. Ex. 3 is based on EPDM with similar fiber levels as Ex. 2, while Comp. Ex. 4 is based on CR elastomer. Note that the EPDM elastomer is Vistalon 2504, from Exxon, with a very low Mooney viscosity of about 25, and a broad molecular weight distribution, and includes about 10 phr of oil, all features intended to help with dispersing the high fiber loading. The EOM elastomer, on the other hand has a much higher Mooney viscosity of about 37, (indicating higher molecular weight), and practically no added oil, yet it was found that the EOM compositions were much easier to mix, mill and calender than the EPDM recipe.

Compound testing results are shown in Table 3.

Compound rheological properties were evaluated according to ASTM D-1646 on a Mooney viscometer with small rotor operated at 132° C. (270° F.) for 30 minutes (the Mooney Scorch results in Table 3. Also, Mooney viscosity was evaluated with large rotor at 125° C. Cure properties were evaluated according to ASTM D-5289 on a rotorless cure meter at 177° C. for 30 minutes and at 200° C. for 3 minutes. In Table 3, ML indicates minimum torque, MH indicates maximum torque, S' is in-phase torque, and S" is out-of phase torque. Based on MH, Ex. 1 with a preferred pulp level is the stiffest of these materials.

Cured compound physical properties were also tested using standard rubber testing. The tensile test results in the with-grain direction in the low strain region are particularly interesting. Modulus was determined using common tensile modulus measurements, in accordance with ASTM D-412 (die C, and using 6"/min. crosshead speed), and "modulus" (M5 and M10) herein refers to tensile stress at given elongation (5% and 10% respectively) as defined in ASTM D-1566 and ASTM D-412. Rubber hardness was tested on standard compression pellets with a durometer according to ASTM D-2240, using the Shore-A and Shore-D scales, for original and oven-aged compound samples. Tear results tested according to ASTM D-624, die-C, in two different directions, with-grain and cross-grain are included for some variables.

It is apparent from the durometer and tensile properties that these are all very stiff, hard compositions, pushing the limits of what can be called flexible rubber for a belt. The with-grain elongation at break (% Eb) at room temperature is only about 15% for these materials, and the stress at 5% or 10% elongation (M5 and M10, respectively) is quite high. The with-grain properties are going to be directly related to the transverse stiffness of the CVT belt. However, the % Eb in the cross-grain direction, the direction for belt flexibility, is significantly larger. In fact, these compounds were intentionally selected to maximize transverse stiffness just within the limits of processability and cross-grain flexibility. The anisotropy ratio (based on either M5 or M10) is another indication of how well the compound should be able to flex in one direction while being extremely stiff in the other. While these four compounds have fairly similar anisotropy ratios, having been compounded to similar modulus or hardness, the inventive examples have significantly higher cross-grain % Eb, predicting much more flexibility in a belt than the comparative examples. The cross-grain tensile strength (Tb) of the inventive examples is also quite a bit higher than the comparative examples, both originally and after heat aging 168 hours at 150° C., attributable to the differences in elastomers. The with-grain tensile strengths are more comparable, attributable to the similarity in fiber loading and orientation. It is clear that the two Ex. materials have the highest M5 and M10 at room temperature (RT) in both grain directions. It is believed this leads directly to the high belt compression stiffness reported later herein, which in turn leads to outstanding performance in CVT use.

It is desirable for the rubber composition for a CVT belt to have a tensile stress, in the mill direction (with-grain), at a strain of 5% of greater than or equal to 1800 psi, greater than or equal to 1900 psi, or greater than or equal to 2000 psi; and for the EOM compound to have an anisotropic ratio at a tensile strain of 5% of greater than or equal to 4, or greater than or equal to 4.5, or greater than or equal to 5. The use of EOM or EBM with both aramid pulp and aramid staple makes this possible.

Table 3 includes the results of three abrasion tests for wear resistance, the so-called DIN test (DIN 53516 or ISO 4649), the PICO abrasion test (ASTM D-2228), and the Taber abrader test (ASTM D-3389). The DIN and Taber test results are in terms of volume loss, so lower is better. The PICO test is reported as an index, and a higher index indicates better resistance to abrasion. It can be seen that the abrasion resistance for the inventive examples are generally equivalent or sometimes better than the comparative examples, depending on which test and conditions.

DeMattia flex crack growth test was according to ASTM D-430 (pierced) at RT and at 125° C., 0.5" stroke. Both with-grain and cross-grain were slated for test, but not all results were available for all compounds. At room temperature Ex. 1 is about an order of magnitude better than Comp. Ex. 3 and 4.

Figure 4:
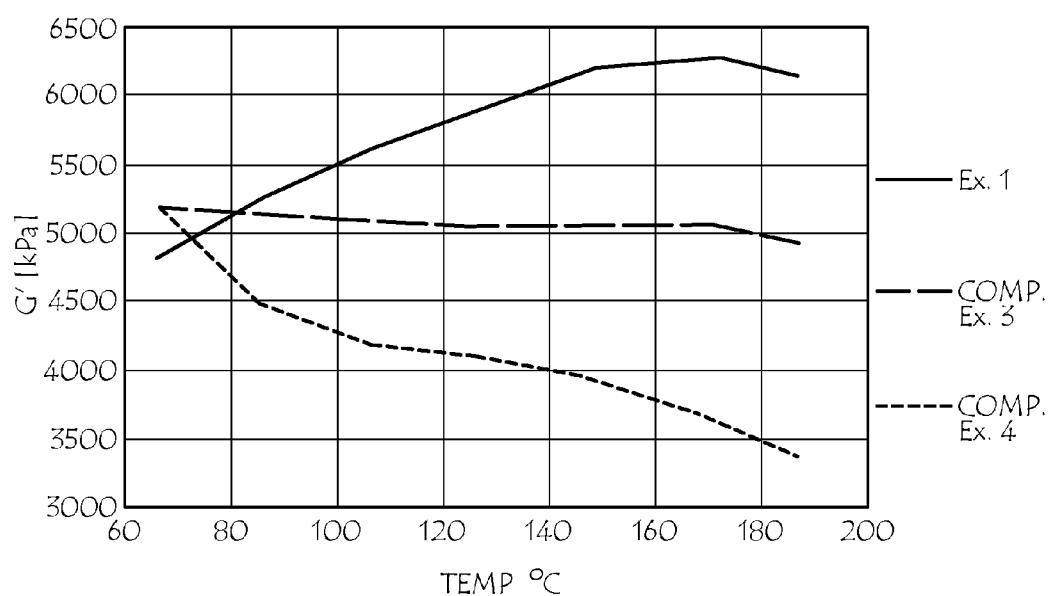
FIG. 4 is a graph of elastic modulus versus temperature for three example compositions.

Compound dynamic properties were evaluated according to ASTM D-6204 using temperature sweeps on the RPA2000 tester at 6.98% strain after curing the composition. The compound elastic modulus (G') results are shown in FIG. 4 (Ex. 2 was not included in this test). It can be seen that the inventive Ex. 1 has a much more favorable temperature dependent modulus that Comp. Ex. 3 or 4. Comp. Ex. 4 in particular shows considerable softening with temperature. The effect on CVT belt performance is believed to be less "heat fade" where belt performance degrades at higher operating temperatures.

Note some observations on processing of the compounds. Comp. Ex. 4, based on CR elastomer with low Mooney viscosity and broad MW, has oil added to the composition, but still is quite difficult to process in terms of mixing and calendering without scorching the rubber. The sensitivity of CR to heat makes dispersing the fiber while maintaining adequate scorch safety very difficult. The improved heat resistance and processing of the ethylene elastomers is an advantage over CR. The comparative EPDM example used a 25 Mooney, broad molecular weight polymer with nearly 10 PHR of plasticizer to achieve adequate processing, whereas the ethylene-alpha-olefin used a 37 Mooney polymer but required no plasticizer in order to achieve good processing. By shifting the ratio of pulp to staple fiber, while adopting the unique properties of the ethylene-alpha-olefin or polyolefin elastomer, the modulus, as indicated by the compound MH provides a significantly improved level of stiffness in the resulting belt which has given exceptional durability and load carrying capabilities.

Speculating further on the reasons for the improved compound performance observed (but with no intent to thereby limit the scope of the invention), one might infer from the higher Mooney viscosity of the EOM, a higher molecular weight polymer. Also, it is generally known that metallocene polymers can have narrower molecular weight distribution (MWD). Polymers with higher molecular weight and narrower MWD often give better physical properties.

To summarize the conclusions from this first series of examples, the choice of EOM or other saturated polyolefin elastomer as the base elastomer, with a combination of aramid pulp and staple fiber at high total fiber loading and predetermined ratio of pulp to total fiber, results in ability to use higher-Mooney elastomer and less oil, giving a more polymer-rich composition, with better processing characteristics, higher cross-grain elongation or flexibility and strength at similar or higher with-grain modulus. Later, these effects will be shown to correlate with dramatic improvements in CVT belt performance.

TABLE 1

| Composition (Volume %) | Ex. 1 | Ex. 2 | Comp. Ex. 3 | Comp. Ex. 4 |
|---|---|---|---|---|
| EOM (Engage 8180) | 63.12% | 63.35% | | |
| EPDM (Vistalon 2504) | | | 58.02% | |
| CR (Neoprene GW) | | | | 53.14% |
| Para-aramid Pulp | 3.35% | 5.08% | 5.10% | 6.15% |
| Para-Aramid Staple fiber | 7.58% | 6.44% | 6.46% | 4.23% |
| Carbon Black | 17.57% | 16.94% | 16.99% | 21.87% |
| Oil | 0.19% | 0.18% | 5.44% | 2.29% |
| Antioxidant | 0.48% | 0.46% | 0.46% | 2.68% |
| ZnO | 0.27% | 0.26% | 0.26% | |
| Peroxide/coagent cure package | 7.43% | 7.27% | 7.27% | |
| Resin/S-Cure package, etc. | | | | 9.64% |
| Total Volume | 100.00% | 100.00% | 100.00% | 100.00% |
| Pulp/Total Fiber (vol/vol) | 30.6% | 44.1% | 44.1% | 59.3% |

TABLE 2

| Composition (phr) | Ex. 1 | Ex. 2 | Comp. Ex. 3 | Comp. Ex. 4 |
|---|---|---|---|---|
| EOM (Engage 8180) | 100.00 | 100.00 | | |
| EPDM (Vistalon 2504) | | | 100.00 | |
| CR (Neoprene GW) | | | | 100 |
| Para-aramid Pulp | 8.70 | 13.05 | 14.28 | 13.5 |
| Para-aramid Staple fiber | 19.01 | 16.53 | 18.10 | 9.0 |
| Carbon Black | 57.07 | 54.35 | 59.52 | 60 |
| Oil | 0.31 | 0.29 | 9.43 | 3.5 |
| Antioxidant | 0.92 | 0.87 | 0.95 | 4.3 |
| ZnO | 2.76 | 2.62 | 2.86 | |
| Peroxide/coagent cure package | 19.88 | 19.21 | 21. | |
| Resin/S-Cure package, etc. | | | | 27.50 |
| Total Parts | 208.65 | 206.92 | 226.14 | 217.8 |
| Pulp/Total Fiber (wt/wt) | 31.4% | 44.1% | 44.1% | 60.1% |

TABLE 3

| (cont'd) | Ex. 1 | Ex. 2 | Comp. Ex. 3 | Comp. Ex. 4 |
|---|---|---|---|---|
| Mooney Scorch (270° F.) MU | | | | |
| Initial Vis. | 185.39 | 156.77 | 156.96 | 130.58 |
| Minimum Vis.(ML) | 98.86 | 76.04 | 71.57 | 75.87 |
| 3 Pt Rise (t3) | 9.73 | 11.65 | 8.56 | |
| 5 Pt Rise (t5) | 12.38 | 15.24 | 11.70 | 7.26 |
| ML(1 + 4) | 89.50 | 76.64 | 71.62 | 76.16 |
| Mooney Viscosity 125° C. (ML1 + 4) MU | | | | |
| ML | 141.05 | 83.87 | | 93.55 |
| ML(1 + 4) | 104.92 | | | 93.55 |
| MDR 2000E (3 min.@ 200° C.) lb · in | | | | |
| MH | 54.98 | 38.88 | 51.70 | 37.88 |
| MH-ML | 52.13 | 36.41 | 49.41 | |
| ML | 2.85 | 2.47 | 2.29 | 4.57 |
| Final S' | 54.87 | 38.75 | 51.70 | 42.45 |
| Final S" | 3.06 | 2.66 | 4.37 | 3.61 |
| Scorch2 | 0.21 | 0.27 | 0.23 | 0.31 |
| T 99 (min) | 1.95 | 1.70 | 2.31 | 2.71 |
| Tan Delta final | 0.06 | 0.07 | 0.08 | 0.09 |
| MDR 2000E (30 min.@ 177° C.) lb · in | | | | |
| MH | 64.15 | 47.46 | 55.45 | 32.79 |
| MH-ML | 61.08 | 44.97 | 53.76 | |
| ML | 3.07 | 2.49 | 2.04 | 4.39 |
| Final S' | 63.69 | 47.12 | 55.45 | 37.17 |
| Final S" | 2.83 | 2.40 | 4.33 | 5.30 |
| Scorch2 | 0.44 | 0.50 | 0.46 | 1.27 |
| T 99 (min.) | 13.16 | 13.43 | 13.89 | 28.06 |
| Tan Delta final | 0.04 | 0.05 | 0.08 | 0.14 |
| Durometer Shore-A | 95.81 | 95.33 | | 92.00 |

TABLE 3-continued

| (cont'd) | Ex. 1 | Ex. 2 | Comp. Ex. 3 | Comp. Ex. 4 |
|---|---|---|---|---|
| Durometer Shore-D | 56.03 | 53.44 | | 53.33 |
| Specific Gravity | 1.17 | 1.15 | 1.18 | 1.41 |
| Original Tensile Pull @ RT psi. | | | | |
| WITH GRAIN | | | | |
| % Eb | 15.54 | 14.71 | 14.63 | 14.32 |
| M5 | 2315.57 | 2184.36 | 1749.13 | 1419.61 |
| M10 | 3427.39 | 3116.31 | 3173.05 | 2882.15 |
| Tb | 3624.92 | 3084.48 | 3317.44 | 3380.58 |
| Break Energy | | | | |
| "C" Tear lb/in kN/m | 470 | | | |
| CROSS GRAIN | | | | |
| % Eb | 105.94 | 141.09 | 72.84 | 77.30 |
| M5 | 435.88 | 399.26 | 265.00 | 317.80 |
| M10 | 683.77 | 633.56 | 434.75 | 515.98 |
| M20 | 1032.43 | 957.40 | 741.46 | 795.94 |
| M25 | 1157.92 | 1067.48 | 868.83 | 898.17 |
| M50 | 1499.06 | 1368.65 | 1269.05 | 1245.33 |
| M100 | 1252.81 | 1616.81 | | |
| Tb | 1850.00 | 1707.97 | 1425.49 | 1479.36 |
| Break Energy | | | | |
| "C" Tear lb/in kN/m | 246 | | | |
| Anisotropy Ratio at 5%, RT | 5.34 | 5.47 | 6.60 | 4.47 |
| Anisotropy Ratio at 10%, RT | 4.95 | 4.92 | 7.30 | 5.59 |
| Original Pull @ 125° C. psi. | | | | |
| WITH GRAIN | | | | |
| % Eb | 12.06 | 12.50 | 9.03 | |
| M5 | 1014.12 | 1059.16 | 1261.06 | |
| M10 | 1492.92 | 1428.77 | | |
| Tb | 1637.76 | 1443.76 | 1666.93 | |
| Break Energy | | | | |
| "C" Tear lb/in kN/m | 151 | | | |
| CROSS GRAIN | | | | |
| % Eb | 59.68 | 55.65 | 38.53 | |
| M5 | 171.52 | 155.51 | 165.65 | |
| M10 | 304.17 | 262.75 | 292.91 | |
| M20 | 503.71 | 402.78 | 493.38 | |
| M25 | 577.20 | 451.26 | 563.75 | |
| M50 | 797.27 | 595.01 | | |
| Tb | 836.10 | 610.09 | 675.66 | |
| Break Energy | | | | |
| "C" Tear lb/in kN/m | 101 | | | |
| Anisotropy Ratio at 5%, 125° C. | 5.91 | 6.81 | 7.61 | |
| Anisotropy Ratio at 10%, 125° C. | 4.91 | 5.44 | | |
| Oven Aged, 168 hr. 150° C. psi. - RT | | | | |
| Durometer Shore-A | 96.39 | | | 93.00 |
| Durometer Shore-D | 57.44 | | | 52.67 |
| WITH GRAIN | | | | |
| % Eb | 14.74 | 14.28 | | 11.49 |
| M5 | 2527.34 | 2340.17 | | 1800.03 |
| M10 | 3648.84 | 3373.09 | | 3832.05 |
| Tb | 4385.98 | 3399.88 | | 4150.52 |
| Break Energy | | | | |
| "C" Tear lb/in kN/m | 507 | | | |
| CROSS GRAIN | | | | |
| % Eb | 87.08 | 99.93 | | 38.99 |
| M5 | 500.76 | 454.48 | | 489.68 |
| M10 | 789.96 | 721.94 | | 808.70 |
| M20 | 1212.16 | 1096.60 | | 1255.09 |
| M25 | 1374.04 | 1218.12 | | 1401.34 |
| M50 | 1749.29 | 1535.91 | | |
| M100 | 1944.49 | 1096.60 | | |
| Tb | 2127.53 | 1752.69 | | 1647.62 |
| Break Energy | | | | |
| "C" Tear lb/in kN/m | 268 | | | |
| Oven Aged, 168 hrs. 150° C. psi. | | | | |
| Pulled at 125° C. | | | | |
| WITH GRAIN | | | | |
| % Eb | 10.06 | 10.13 | | |
| M5 | 1144.21 | 1240.02 | | |

TABLE 3-continued

| (cont'd) | Ex. 1 | Ex. 2 | Comp. Ex. 3 | Comp. Ex. 4 |
|---|---|---|---|---|
| M10 | 1924.78 | 1724.41 | | |
| Tb | 1890.06 | 1722.67 | | |
| Break Energy | | | | |
| "C" Tear lb/in | 238 | | | |
| CROSS GRAIN | | | | |
| % Eb | 52.82 | 58.39 | | |
| M5 | 168.94 | 178.88 | | |
| M10 | 321.81 | 321.63 | | |
| M20 | 544.26 | 519.49 | | |
| M25 | 631.68 | 586.28 | | |
| M50 | 882.77 | 653.05 | | |
| Tb | 846.56 | 805.90 | | |
| Break Energy | | | | |
| "C" Tear lb/in | 101 | | | |
| Din Abrasion (cured 35 min. @ 350° F.) | | | | |
| Horizontal Volume Loss (mm3) | 130.93 | 138.40 | | 161.97 |
| Vertical Volume Loss (mm3) | 107.87 | 94.60 | 101.00 | |
| Pico Abrasion Resistance 35 @ 350° F. | | | | |
| RT Horizontal | 111.07 | 85.60 | | 71.74 |
| RT Vertical | 378.71 | 247.30 | 287.00 | 333.77 |
| 100° C. Horizontal | 53.35 | 39.30 | | |
| 100° C. Vertical | 97.71 | 64.80 | 40.70 | |
| Taber Abrader - Volume Loss (mm$^3$) | | | | |
| RT, Cycles (1000), Load Weight (1000 g), Suction (70), H-18 | 212.42 | 268.20 | 213.60 | 248.78 |
| RT, Cycles (2000), Load Weight (1000 g), Suction (0), Round Cast Iron | 2.66 | 4.20 | 4.30 | 4.22 |
| DeMattia Flex (pierced/0.5" stroke) [in./Mcycle] | | | | |
| RT cross grain | 56 | | 511 | 307 |
| 125° C. cross grain | 5888 | 511 | | 3680 |
| 125° C. with grain | 9200 | | | |
| [kcycle/inch] or [kcycle/2.54 cm] | | | | |
| RT cross grain | 53.38 | | 2.54 | 3.26 |
| 125° C. cross grain | 0.44 | 2.54 | | 0.76 |

In a second series of composition examples, four different polyolefin elastomers were compared in the same base recipe. The compositions, in phr, are shown in Table 4. The total fiber loading was about 28 phr and about 11 volume %. The amount of pulp was about 31% of the total fiber weight. The main purpose of this series was to evaluate processability, in terms of dispersion of ingredients in an internal mixer, handling on a two-roll mill, both of which were repeated three times. The results are indicated in Table 4 with "+" indicating very good handling and dispersion, "o" indicating ok or acceptable handling or dispersion, "−" indicating not good handling on the mill and some undispersed ingredients out of the mixer, and "−−" indicating poor processability. As indicated, some variables came out crumbly from the mixer, but generally could be brought together on the mill. The worst case exhibited a scaly surface, even after milling and three passes in the mixer. Clearly, with all other ingredients being equal, at these levels of fiber loading, EOM is the best, with EBM acceptable, EPM difficult but possible to use, and EPDM the most difficult to process.

TABLE 4

| Composition (phr) | Ex. 5 | Ex. 6 | Ex. 7 | Comp. Ex. 8 |
|---|---|---|---|---|
| EOM (Engage 8180) | 91.3 | | | |
| EBM (Exact 9061) | 0 | 91.3 | | |
| EPM (VISTALON V706) | 0 | | 91.3 | |
| EPDM (Nordel 3745) | 0 | | | 91.3 |
| Carbon Black | 57.07 | → | → | → |
| 1-mm para-aramid staple | 19.15 | → | → | → |
| 50% para-aramid pulp in EPDM masterbatch | 17.4 | → | → | → |
| Antioxidant | 0.92 | → | → | → |
| ZnO | 2.76 | → | → | → |
| Paraffinic Oil | 0.31 | → | → | → |
| Peroxide cure package | 20.36 | → | → | → |
| Total Parts | 209.27 | → | → | → |
| Pulp/Total Fiber (wt/wt) | 31% | → | → | → |
| 1st pass in mixer | + | + | crumbly | crumbly |
| on mill | + | brittle | o | − |
| 2d pass in mixer | + | o | crumbly | crumbly |
| on mill | + | o | o | o |
| 3d pass in mixer | + | + | − | crumbly |
| on mill | + | + | −scales | −−scales |
| overall processability | + | o | − | −− |

Belt Examples and Test Results:

In a first comparison, two belt embodiments, Belt A and Belt B are compared with two commercial CVT belts: Comp. Belt C, which is sold by Gates Corporation and Comp. Belt D, identified with part number 715000302.

These belts all have pretty much the same dimensions as shown in Table 5, with nominal 31 mm top width, 952 mm length, and 26° V-angle. Comp. Belts C and D are heavier than Belts A and B due to the CR elastomer density being greater than EOM. Belt B was made with the same inventive materials as Belt A, but a little bit less rubber in the undercord portion of the belt, making Belt B a little thinner and lighter. Comp. Belts C and D are considered examples of highly optimized belts utilizing conventional rubber compositions.

These belts were subjected to a number of tests designed to identify performance differences. These tests include a belt conditioning test lasting about six hours, followed by a Load Capability Test, Axial Stiffness Test, Bending Loss Test, and at the end of these tests (about 8 hours total), a Belt Weight Loss Test.

The Belt Weight Loss Test results are shown in Table 5. The initial weight of the inventive belts is approximately 20% lower than the CR belts for the same belt size. Surprisingly, after the eight hours of performance testing, the wear of the inventive CVT belts was less than half of the wear of Comp. Belt D. A check of the final belt dimensions indicates a combination of wear on the sidewalls and permanent reduction in width from compression (indicated by a small increase in thickness).

TABLE 5

|  | Belt A | Belt B | Comp. Belt C | Comp. Belt D[1] |
|---|---|---|---|---|
| Body Composition | Ex. 1 | Ex. 1 | Comp. Ex. 4 | CR |
| Tensile cord | aramid | aramid | aramid | aramid |
| Weight (g) | 396.29 | 379.4 | 474.42 | 461.50 |
| thickness (mm) | 15.20 | 14.83 | 15.25 | 16.79 |
| Pitch length (mm) | 952 | 952 | 951 | 951 |
| Belt Weight Loss Test (g) | −0.94 | −1.04 | −1.74 | −2.66 |
| Width change (mm) | −0.52 | −0.51 | −0.96 | −0.77 |
| Thickness change (mm) | 0.07 | 0.08 | 0.12 | 0.07 |

[1]Comp. Belt D is a representative competitor's premium belt of unknown details, but believed to be CR elastomer with aramid tensile cord.

The Load Capability Test is designed to simulate the conditions of the CVT belt drive with all significant phenomena encountered in the application. This test is carried out under a controlled, reproducible environment and measuring as many parameters as is practical, including speed loss, belt slip and belt axial deformation. In addition belt temperature is measured as it increases due to frictional and hysteretic energy losses. Test is conducted on an electric dynamometer simulating CVT belt under-drive conditions. During the test the speed of the driver shaft is constant at 1,500±1 rpm. Applied torque and hub load are varied. Test parameters are selected in such a way that some of the tested belts reach the extreme conditions: (1) belt temperature up to about 170° C.; or (2) excessive speed loss (up to 15% caused by belt slip and belt deformation in the sheaves).

Figure 5:
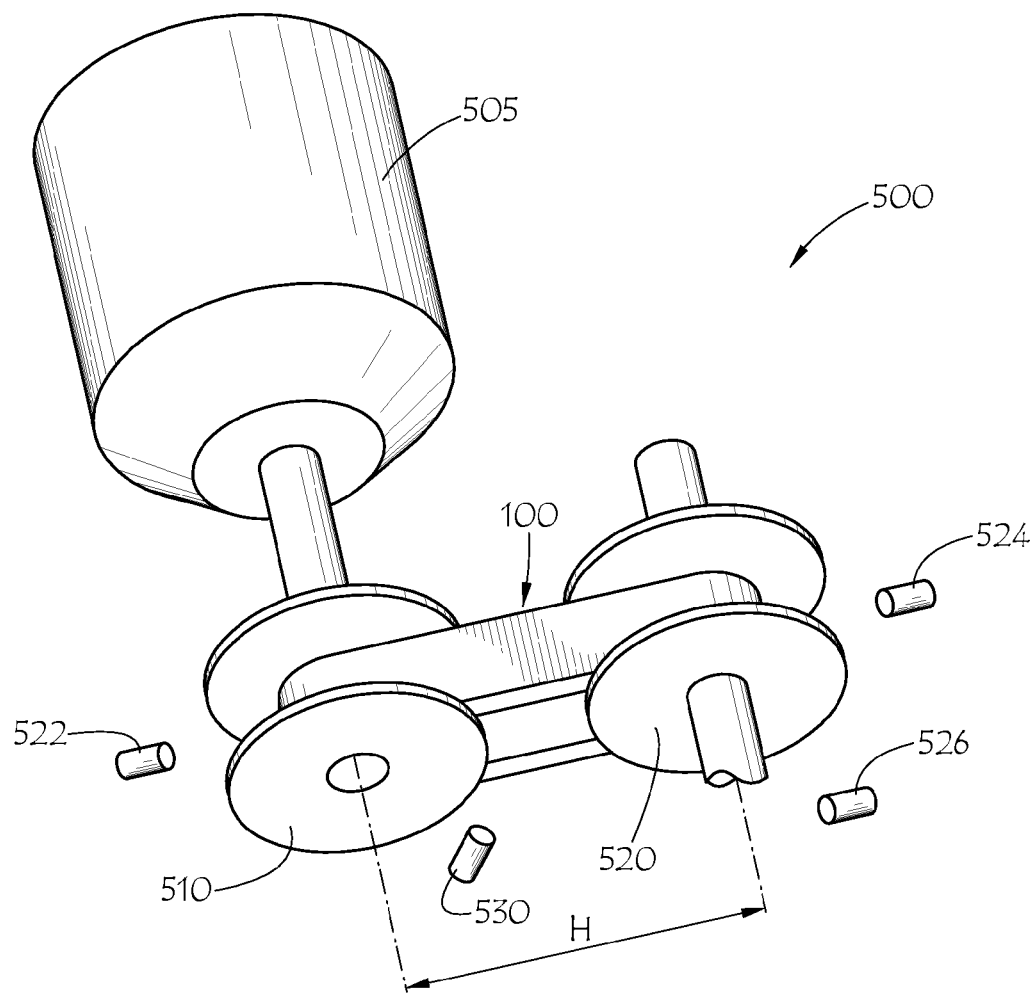
FIG. 5 is a diagram of the Load Capability Test rig arrangement.

The Load Capability Test rig arrangement 500 is shown in FIG. 5. Electric motor 505 drives the driver pulley 510 on the left, and the CVT belt 100 transfers motion to the second pulley 520 where the electric generator (not shown) applies a resisting torque. The generator is mounted on a fixture that can move to the right applying constant total tension, i.e., hub load H, with position sensor 526. With the distance fixed between the two halves of the pulleys, the hub load or total tension controls the axial force applied to the belt in the driver and driven pulleys. To some extent, this simulates the function of a driven CVT clutch. Spacers inside the pulleys allow changing the belt pitch diameters, monitored by sensors 522 and 524, and the intended speed ratio. For these tests the speed ratio is set at approximately 1.6. The actual speed ratio will change with applied torque and hub load, and it is also influenced by the belt running temperature, measured with sensor 530.

The speed loss, s, is defined as percentage of change of the driven pulley speed, $N_n$, due to a change in the load torque. It is calculated in reference to the driven pulley speed at zero torque, $N_{no}$ (no speed loss conditions) according to the following formulae:

$$s\ \% = \frac{N_{n0} - N_n}{N_{n0}}\%$$

The speed loss is obtained by direct measurements of both shaft speeds. During the test the driver pulley speed is kept constant with precision of about 0.1%. The belt slip can also be determined from the speed loss and the measured belt pitch diameters.

Figure 6:
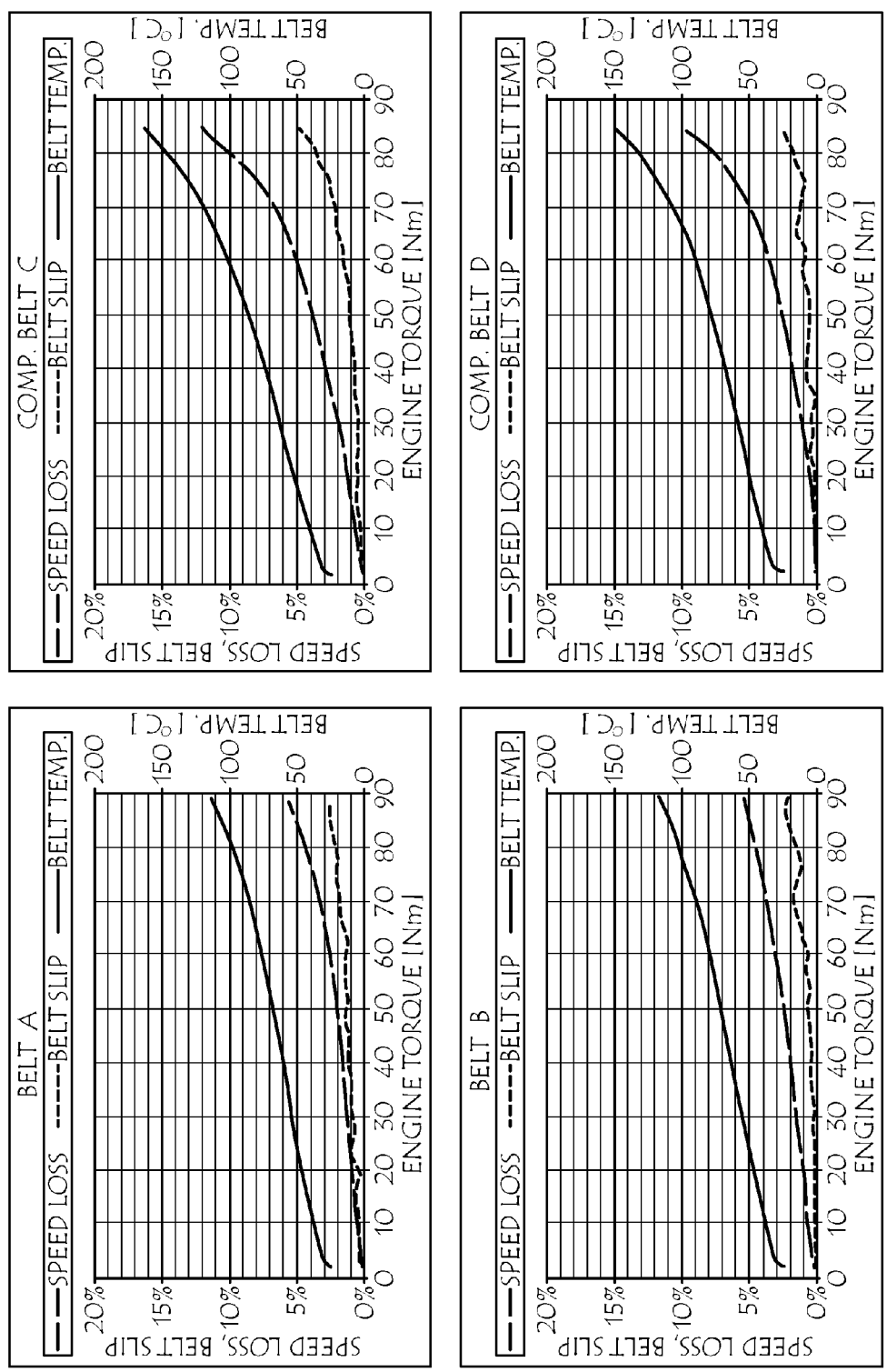
FIG. 6 Graphs showing speed loss, belt temperature, and belt slip for four belt constructions on the Load Capability Test.

In the Load Capacity Test, Belts A and B show much better performance over the Comp. Belts C and D, as seen in FIG. 6. Specifically, the speed losses are lower by up to about 50%, depending on the torque level. Belts A and B could be run at higher torque without reaching the extreme conditions mentioned above. Using Belt A or B, on the same vehicle would result in a higher maximum achievable speed than with one of the Comp. Belts. Also, the inventive belt temperatures are lower by up to 30 to 40° C., depending on power level. Speed loss and belt axial deformation are the main reasons for the heat generation and increased belt temperature seen in FIG. 6. To keep belt temperatures from running away by keeping speed loss at some acceptable level (<4%) would require limiting the torque range at which the belt can be used for a prolonged time. Thus, the inventive Belts A and B may be run at higher continuous torques or loads, relative to the Comp. Belts.

Figure 7:
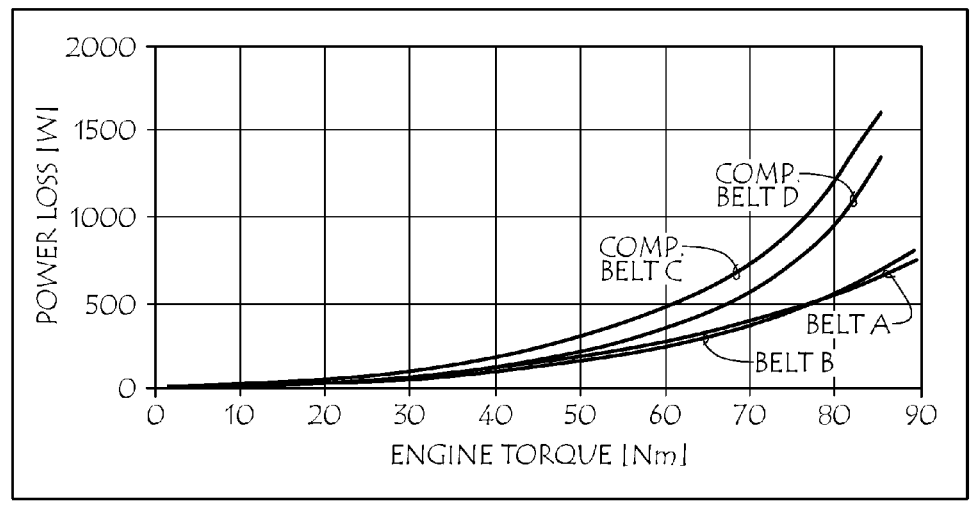
FIG. 7 Graph of power loss on the Load Capability Test for four belt constructions.

In the Load Capacity Test, there is speed loss present at any load condition. As a result, the transfer of power, P, by the CVT drive is associated with a power loss, $P_s$, due to the speed loss. It can be expressed by the formulae, $P_s = P \times s$ %. The power loss results are shown in FIG. 7. The inventive Belts are significantly more efficient than the Comp. Belts.

Finally, the Load Capacity Test pushed the belts beyond the torque levels of FIG. 6 to explore the short term, peak load capacity of the belts. This portion of the test starts at room temperature and at zero value for the torque. Every one minute the torque load is increased by 5 Nm until it reaches 145 Nm. The resulting speed loss and belt temperature at three select torque levels and the belt width change at the maximum torque are shown in Table 6. These temperatures do not represent thermal equilibrium since the test is stopped after 30 minutes. If the test had been continued past that time limit, the belt temperatures would have been much higher. For the two Comp. Belts, belt temperatures and slip levels approached the material limits. Clearly, the inventive belts have much higher peak torque capacity than conventional optimized belts.

Figure 10:
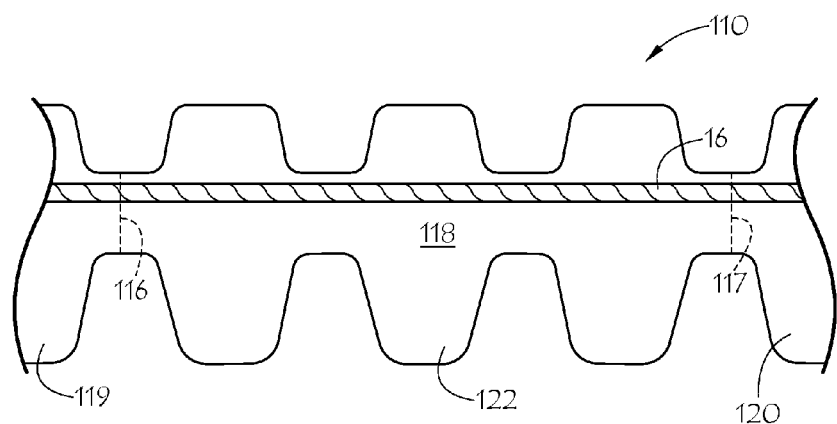
FIG. 10 illustrates sample preparation for the Gates Compression Test.

Table 6 includes a comparison of belt width change due to high torque load. This axial compression of the belt is one of the direct causes of speed loss—change in belt width results in reduced pitch diameter of the belt in the driver and driven pulleys, which results in reduced speed ratio and speed loss. The inventive belts exhibit much less axial compression, a direct result of the increased transverse stiffness characteristics of the inventive rubber compositions. In addition, the strong performance of the thinner Belt B suggests the thickness can be advantageously reduced with the improved transverse properties of these rubber compositions. Thus, a thickness less than 15.0 mm may be advantageous. The cord position may also advantageously be adjusted to ride closer to the back surface or roots than to the underside surface or roots, as illustrated in FIG. 10.

TABLE 6

|  | Belt A | Belt B | Comp. Belt C | Comp. Belt D |
|---|---|---|---|---|
| Speed loss at 100 Nm torque (%) | 3.1 | 3.1 | 5.5 | 4.2 |
| Speed loss at 120 Nm torque (%) | 3.9 | 4.0 | 7.7 | 6.2 |
| Speed loss at 145 Nm torque (%) | 5.2 | 5.7 | 12.6 | 11.3 |
| Belt Temperature at 100 Nm torque (° C.) | 83 | 79 | 103 | 96 |
| Belt Temperature at 120 Nm torque(° C.) | 96 | 93 | 126 | 118 |
| Belt Temperature at 145 Nm torque (° C.) | 117 | 116 | 171 | 159 |
| Belt width change at 145 Nm torque (mm) | −0.4 | −0.7 | −1.8 | −1.6 |

A Dynamic Axial Stiffness Test ("DAST") was run on these four belts to see the direct influence of the rubber composition on the belt. As discussed above in the background section, belt change in width caused by belt compression under drive tension is one of the key characteristics of the belt because it influences the speed loss or speed ratio and energy loss in the CVT drive resulting in higher temperature and lower efficiency of the drive. The DAST explores the influence of the belt tension on the change in belt width. The test rig configuration is the same as used for the Load Capability Test (FIG. 5).

Belt axial stiffness is defined for the specific test configuration:

$$k_{axial} = \frac{\Delta H}{\Delta W} \frac{1}{2 \tan\left(\frac{A}{2}\right)} = 2.17 \times \frac{\Delta H}{\Delta W}$$

Change in applied hub load, $\Delta H$, in the drive results in the change of belt width, $\Delta W$. The hub load force is recalculated into the axial (parallel to shaft axis) direction force component. It represents the pressure between belt and the pulley wall. Using the fact that the pulley groove angle A=26 degrees in this test gives the constant 2.17.

For the purposes of the Dynamic Axial Stiffness Test, the belt is installed with driver pulley pitch diameter of 95±5 mm, speed ratio of 1.6±0.1, load torque of 30 Nm, and driver shaft speed of 1500 rpm. The initial hub load is set to H=3000±100 N, and the belt is run for about 30 minutes until the belt temperature is above 90° C., but not greater than 120° C. Belt radial position is recorded. Then hub load is gradually reduced to H=600 N, measuring belt radial position at each step. The reported axial stiffness is calculated from the belt width difference between 3000N and 600N using the above formula. The stiffness is the slope of the least squares best fit line through the H versus $\Delta W$ data. The test can be done on belts of any width, in principle, but preferably the belt width ranges from 25 mm to 35 mm. Likewise, belt length should not affect the test very much. The test could also be scaled if necessary to evaluate very small or very large belts. For small belts, the hub load may be reduced, still providing a linear response region for determining the stiffness. For larger belts, the hub load values or range can be increased to provide for seating the belt in the pulleys and producing a suitable width reduction. Thus, hub load should be chosen as appropriate, related to the maximum application tension in the drive. At similar pitch diameter, belt size should not affect the transverse stiffness numbers much. However, if small diameter pulleys (or pitch line) is required for smaller belts, or larger diameter pulleys or pitch line for larger belts, then the stiffness would have to be adjusted for the difference in wrap distance in order to compare results with these ATV-size belts. The adjustment could be the equivalent of determining a modulus value instead of stiffness. More preferable is evaluating belt transverse stiffness using the compression test described later, at constant sample area and thickness.

The summary of the DAST results is shown in Table 7. Thus, the belt rubber composition in Belts A and B leads directly to a decrease in width reduction, which is attributable to an increased axial stiffness of the belt, relative to the comparative belts. Belts A and B show a dynamic axial stiffness which averages about 75% higher than Comp. Belts C and D. This in turn leads to the performance improvements described earlier, namely lower belt running temperature, reduced radial slip, higher load capacity, and lower speed losses. In an application such as an ATV, this should lead to better acceleration, higher top speeds, lower belt temperatures, less fade, etc. This also should reduce the loss of power required to radially slide the belt into and out of the pulleys at the entrance and exit when belt is transitioning between the spans and inside the pulleys.

In light of the results of the Dynamic Axial Stiffness Test and its correlation with CVT drive performance, it is advantageous that a rubber CVT belt exhibit a Belt Dynamic Axial Stiffness greater than 5.0 kN/mm or greater than 6.0 kN/mm or greater than 7.0 kN/mm, or from about 7 to about 8 kN/mm. It should be understood these numbers are based on the ATV belt sizes and test setup described herein, and may be transformed on a similar basis for other sizes of belts on other test setups.

TABLE 7

|  | Belt A | Belt B | Comp. Belt C | Comp. Belt D |
|---|---|---|---|---|
| Belt width reduction at H = 3 kN (mm) | 0.88 | 0.90 | 1.60 | 1.51 |
| Belt Dynamic Axial Stiffness[1] (kN/mm) | 7.4 | 7.3 | 4.1 | 4.3 |

[1]at 90° C. approximately.

In light of the above results, a simpler axial stiffness test was devised based on ASTM D575-91 (reapproved in 2012), Test Method A, and called the Gates Compression Test ("GCT") herein. The ASTM D575 method is used for compression measurements of elastomeric materials, using standard cylindrical buttons of 28.6±0.1 mm diameter, i.e., about 650 mm² (1.000 in²) circular cross-sectional area and 12.5±0.5 mm (0.5 in) height. It is impossible to make such a sample from the CVT belts, so a length of belt is prepared as illustrated in FIG. 10. An initial rough cut piece of belt 110 is provided. The belt width is cut down to 12.5±0.5 mm (0.5 in) with parallel side surfaces 118 (and the corresponding opposing surface which is not visible). The sample belt 110 length is trimmed at cut marks 116 and 117, discarding end portions 119 and 120, to give a final test specimen 122 with total side surface 118 area of 650±5 mm², which is confirmed using a digital microscope with area measuring capability. Because of the stiffness of the materials and the relatively small deformations, sandpaper (called for in the ASTM test) is not used between the flat platens of a compression tester and the specimen 122.

The tests are conducted on a dynamic tensile machine using three samples cut from the same belt, measured separately. Also, the tests are run applying sinusoidal signal of displacement and recording force at the changing displacement. The test has been run at three different frequencies 2.5 Hz, 15 Hz and 30 Hz and at two values of temperature 23° C. and 90° C., although other conditions could be used. The frequency dependence was not very strong, so the 15 Hz results are used. The 90° C. temperature represents typical CVT belt operating range at high loads. The displacement range is based on the measured typical CVT belt axial deformation (i.e., compression) in the CVT drive pulleys under the relatively high, close-to-rated-load conditions for the applications, namely from 0.3 to 0.9 mm.

Figure 8:
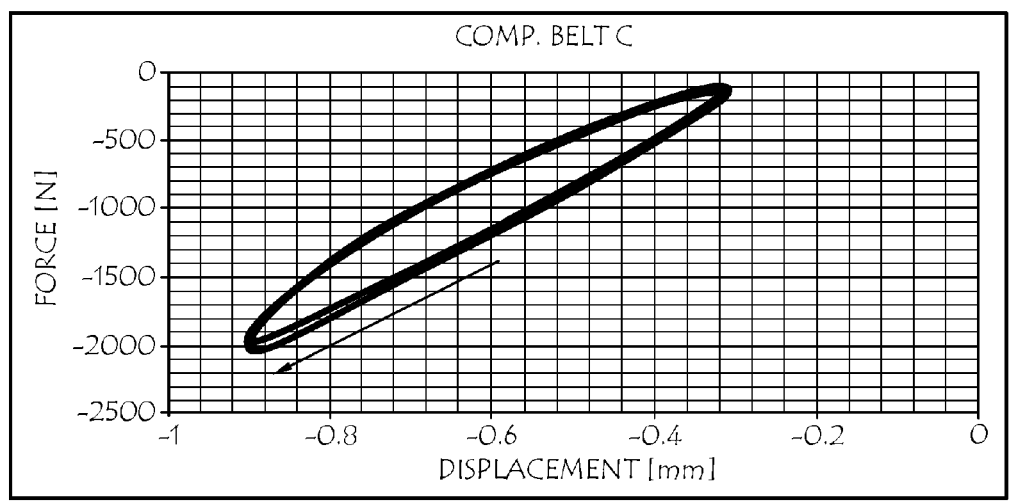
FIG. 8 is a graph of Gates Compression Test data for a CVT belt sample of Comp. Belt C tested at 90° C.
Figure 9:
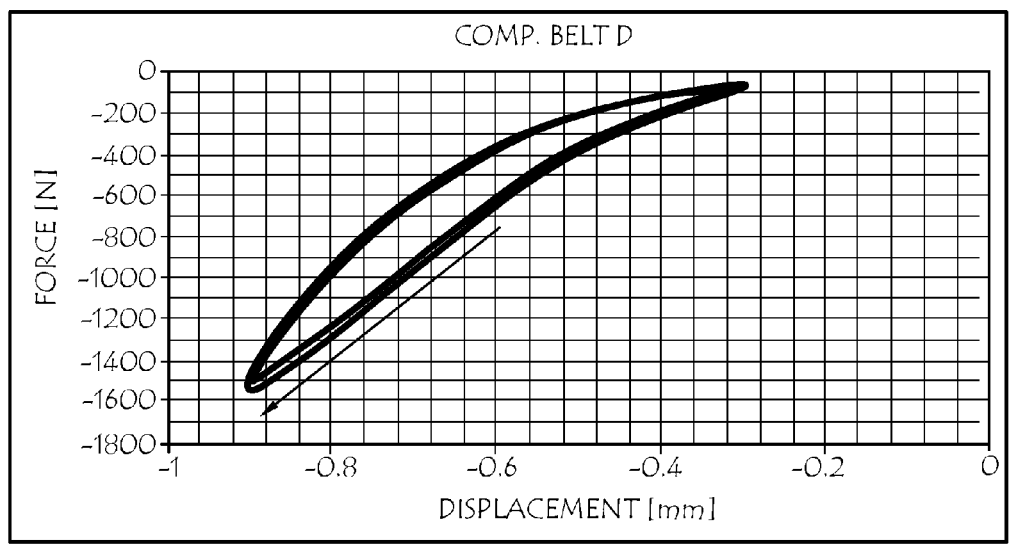
FIG. 9 is a graph of Gates Compression Test data for a CVT belt sample of Comp. Belt D tested at 90° C.

FIG. 8 shows an example of the Gates Compression Test ("GCT") data for a CVT belt sample of Comp. Belt C tested at 90° C. Note that the loading portion (the lower part of the loop indicated by the arrow) is substantially linear, the slope thereof providing the axial stiffness of interest. The results can optionally be normalized by the area and thickness of the sample, but will not be done here since all the samples have the same dimensions. Some belts show more curvature in the force response, such as the Comp. Belt D sample shown in FIG. 9. For all the samples tested, the portion between −0.6 and −0.9 mm displacement was sufficiently linear for providing a slope or stiffness value as indicated in FIG. 9. Thus, compression stiffness is calculated using the linear section of the curve as illustrated by the arrow between displacement of −0.6 mm and −0.9 mm (the maximum displacement).

Table 8 shows the test results for a collection of comparative belts found in the market, as well as the inventive Belt A. The four belts tested on both the GCT and DAST show a good correlation between the two tests, although the DAST values tend to be higher than the GCT values at the same temperature of 90° C. The difference could be the effect of friction force in the radial direction present between belt and sheave in the DAST. The inventive belt stands out from the pack with the highest stiffness on both tests. Thus, the GCT stiffness also correlates with CVT drive performance.

In light of the results of the Gates Compression Test and its correlation with CVT drive performance, it is advantageous that a rubber CVT belt exhibit a Gates Compressive Test stiffness greater than or equal to 5.0 kN/mm at 90° C. or greater than 6.0 kN/mm or 7.0 kN/mm or 8 kN/mm at room temperature, or from about 8 to about 9 kN/mm at room temperature.

TABLE 8

| Ex. | Description | W [mm] | GCT/23° C. k [kN/mm] | GCT/90° C. k [kN/mm] | DAST k [kN/mm] |
|---|---|---|---|---|---|
| Belt A | Inventive Belt A | 33 | 8.6 | 5.0 | 7.4 |
| Belt B | Inventive Belt B | 33 | — | — | 7.3 |
| Comp. Belt C | Gates CR-aramid cord | 33 | 5.1 | 3.3 | 4.1 |
| Comp. Belt D | MBL BRP 715000302 | 33 | 3.7 | 3.0 | 4.3 |
| Comp. Belt E | MBL BRP 715900212 | 33 | 1.9 | 1.5 | — |
| Comp. Belt F | Huansong (Blue Label) 2113SS-305 | 33 | 2.9 | 1.8 | — |
| Comp. Belt G | Huansong (Bando) 911.531.528 | 33 | 3.1 | 3.1 | — |
| Comp. Belt H | Carlisle JD M168196 RSX-182 | 31 | 3.2 | 2.5 | — |
| Comp. Belt I | Gates CR-carbon cord | 33 | 4.6 | 2.9 | 4.6 |
| Comp. Belt J | Huansong (Red Label) 2213SS-220 | 33 | 3.7 | 2.4 | — |
| Comp. Belt K | Scooter belt EPDM-carbon cord | 22 | 4.4 | 3.7 | — |
| Comp. Belt L | Scooter belt EPDM-polyester cord | 20 | 5.8 | 4.8 | — |

An additional test for the bending losses of a CVT Belt was carried out on belts A-D, herein called the Bending Loss Test ("BLT"). This test was able to separate two sources of loss, bending loss and radial friction loss. The BLT rig for measuring bending and radial friction losses in CVT Belts was similar in layout to the LCT rig described in FIG. 5. The rig allowed for measuring the hub load, shaft speeds and torques at a chosen temperature, which again was 90° C.

The measured losses represent torque required to rotate the CVT belt in the simple drive with two small diameter pulleys with no resistance applied to the driven shaft. For simplicity, the torque losses measured at relatively low hub load are defined as belt bending losses, and the difference in torque losses due to an increase in hub load is defined as the frictional loss due to radial sliding.

The results from the belt Bending Loss Test are two numbers: bending loss and radial friction loss. They are calculated as averages from the measured torque losses. In Table 9 there are test results for four belt constructions, three repeat tests for each value reported.

The losses due to bending are about 20% higher for the inventive belts, which may be reflective of the higher modulus rubber compositions used. At the same time, the losses to overcome friction in radial sliding in and out of the pulley are approximately 40% lower, resulting in overall better efficiency on a CVT drive with the inventive belts.

TABLE 9

| | Belt A | Belt B | Comp. Belt C | Comp. Belt D |
|---|---|---|---|---|
| Bending Loss (Ncm) | 59, 63, 55 | 51, 54, 51 | 50, 52, 46 | 51, 45, 49 |
| Friction Loss (Ncm) | 77, 83, 81 | 86, 83, 83 | 112, 107, 111 | 122, 113, 107 |

In summary, they axial stiffness of inventive Belts A and B is approximately 70% higher than other belts, speed losses are lower at rated torque by 2% to 5%, and the losses due to bending are about 20% higher while the losses to overcome friction in radial sliding in and out of the pulley are approximately 40% lower, resulting in overall better performance on a CVT drive.

The fiber-loaded rubber compositions described herein may have other applicability besides CVT belts. Other power transmission belts such as V-belts and multi-V-ribbed belts, which also benefit from high transverse stiffness could also be within the scope of the invention. Toothed or synchronous power transmission belts could also benefit from these compounding concepts, although the orientation effect therein would best be directed parallel to the belt running direction, at least in the teeth, which is the direction of maximum load on the teeth.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. An endless rubber CVT belt comprising a main belt body comprising a compression portion, tension portion, an adhesion portion, and a tensile cord in contact with the adhesion portion and embedded between the compression portion and the tension portion, angled sides, and a width to thickness ratio on the order of 2; wherein at least one of the compression portion, the tension portion and the adhesion portion comprises an elastomer composition comprising a saturated ethylene-alpha-olefin elastomer, a staple fiber, and a pulp fiber.

2. The belt of claim 1 wherein the aramid staple fiber is para-aramid and the aramid pulp fiber is para-aramid.

3. The belt of claim 1 wherein the alpha-olefin of the ethylene-alpha-olefin elastomer is octene or butene.

4. The belt of claim 3 wherein the ethylene-alpha-olefin elastomer is ethylene-octene elastomer with an ethylene content in the range of below 75% by weight and a melt flow rate less than 5 gm/10 min. based on ASTM D1238-13 with 2.16 kg at 190° C.

5. The belt of claim 3 wherein the ethylene-alpha-olefin elastomer is ethylene-butene elastomer with an ethylene content in the range of 60.0% to 65.0% by weight.

6. The belt of claim 1 wherein the total amount of the aramid staple fiber and aramid pulp fiber is between 3 and 19 volume percent of the composition and between 1 and 65 phr.

7. The belt of claim 1 wherein the belt exhibits a stiffness on the Dynamic Axial Stiffness Test of greater than 5.0 kN/mm.

8. The belt of claim 1 wherein the belt exhibits a stiffness on the Gates Compression Test of greater than or equal to 5.0 kN/mm at 90° C. and greater than 6.0 kN/mm at room temperature.

9. The belt of claim 1 wherein the overall belt thickness is less than 15 mm.

10. The belt of claim 9 wherein the cord position is closer to the backside than to the underside of the belt.

11. An endless power transmission belt comprising a main belt body comprising:
a tensile cord embedded in said belt body, and
an elastomer composition comprising an elastomer, a high-modulus staple fiber, and a high-modulus pulp fiber; wherein the high-modulus pulp fiber constitutes less than 40% of the total amount of the high-modulus staple fiber and the high-modulus pulp fiber.

12. The power transmission belt of claim 11 in the form of a toothed belt, a V-belt, or a multi-V-ribbed belt.

13. The belt of claim 11 wherein the elastomer is an ethylene-alpha-olefin elastomer, and the total amount of the high-modulus staple fiber and the high-modulus pulp fiber is between 3 and 19 volume percent of the elastomer composition.

14. The belt of claim 11 wherein the elastomer is a saturated ethylene-alpha-olefin elastomer.

15. The belt of claim 11 wherein the elastomer composition further comprises other elastomers at less than 50% of the total elastomer present by weight.

16. The belt of claim 11 wherein both the high-modulus staple fiber and high-modulus pulp fiber are aramid fibers.

* * * * *

UNITED STATES PATENT AND TRADEMARK OFFICE
CERTIFICATE OF CORRECTION

PATENT NO. : 9,933,041 B2
APPLICATION NO. : 15/152452
DATED : April 3, 2018
INVENTOR(S) : Bobbie E. South, Jerzy Otremba and John Francisco Dayberry It is certified that error appears in the above-identified patent and that said Letters Patent is hereby corrected as shown below:

Column 23, Line 47, insert after "a pulp fiber" at the end of Claim 1 the following text:
--, wherein the staple fiber is an aramid staple fiber and the pulp fiber is an aramid pulp fiber, wherein the volume or weight of the aramid pulp fiber is less than 40% of the total volume or weight of the aramid staple fiber plus the aramid pulp fiber in the elastomer composition--

Signed and Sealed this
Fourth Day of September, 2018

Andrei Iancu
*Director of the United States Patent and Trademark Office*